Patented June 17, 1941

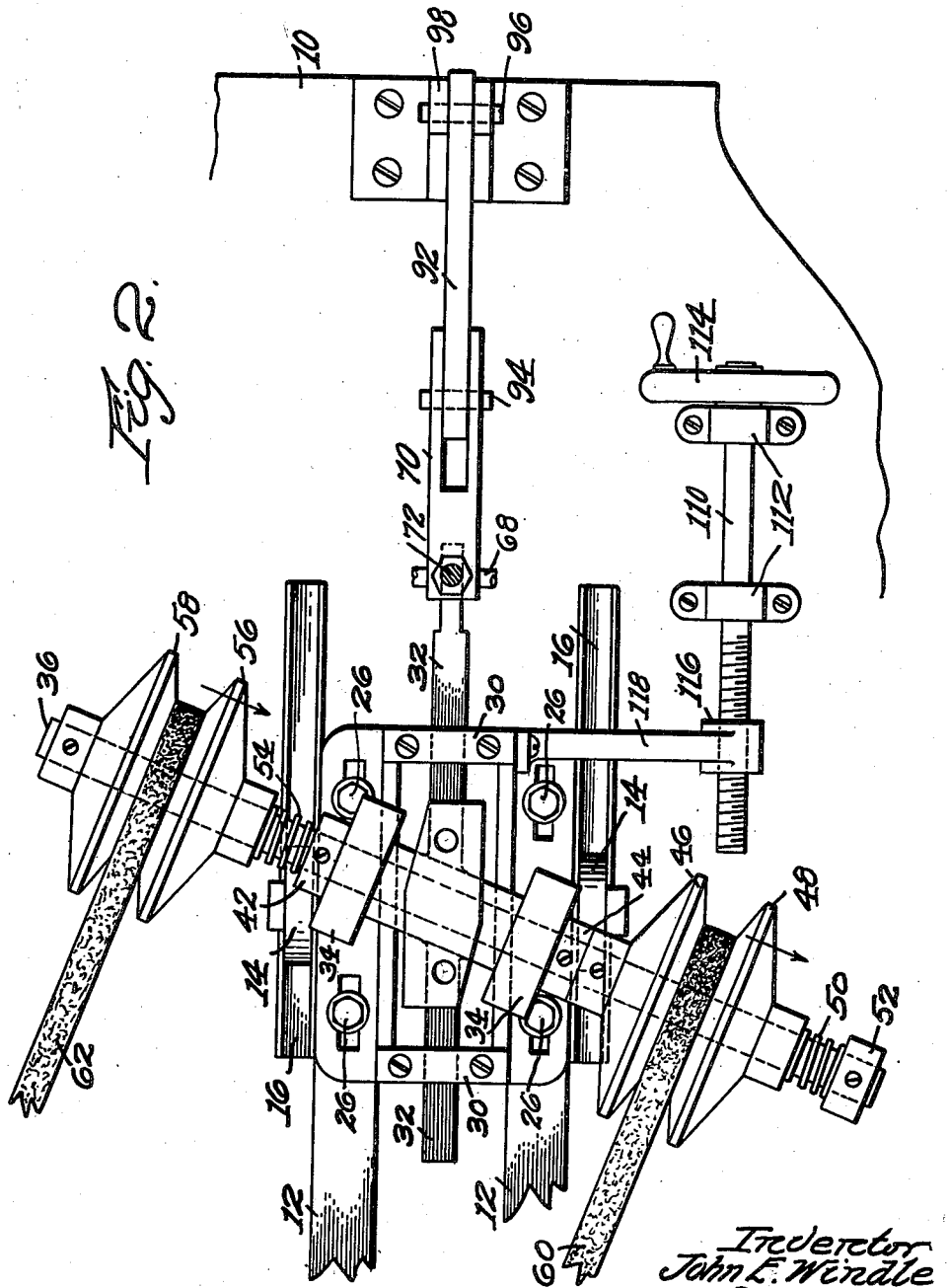

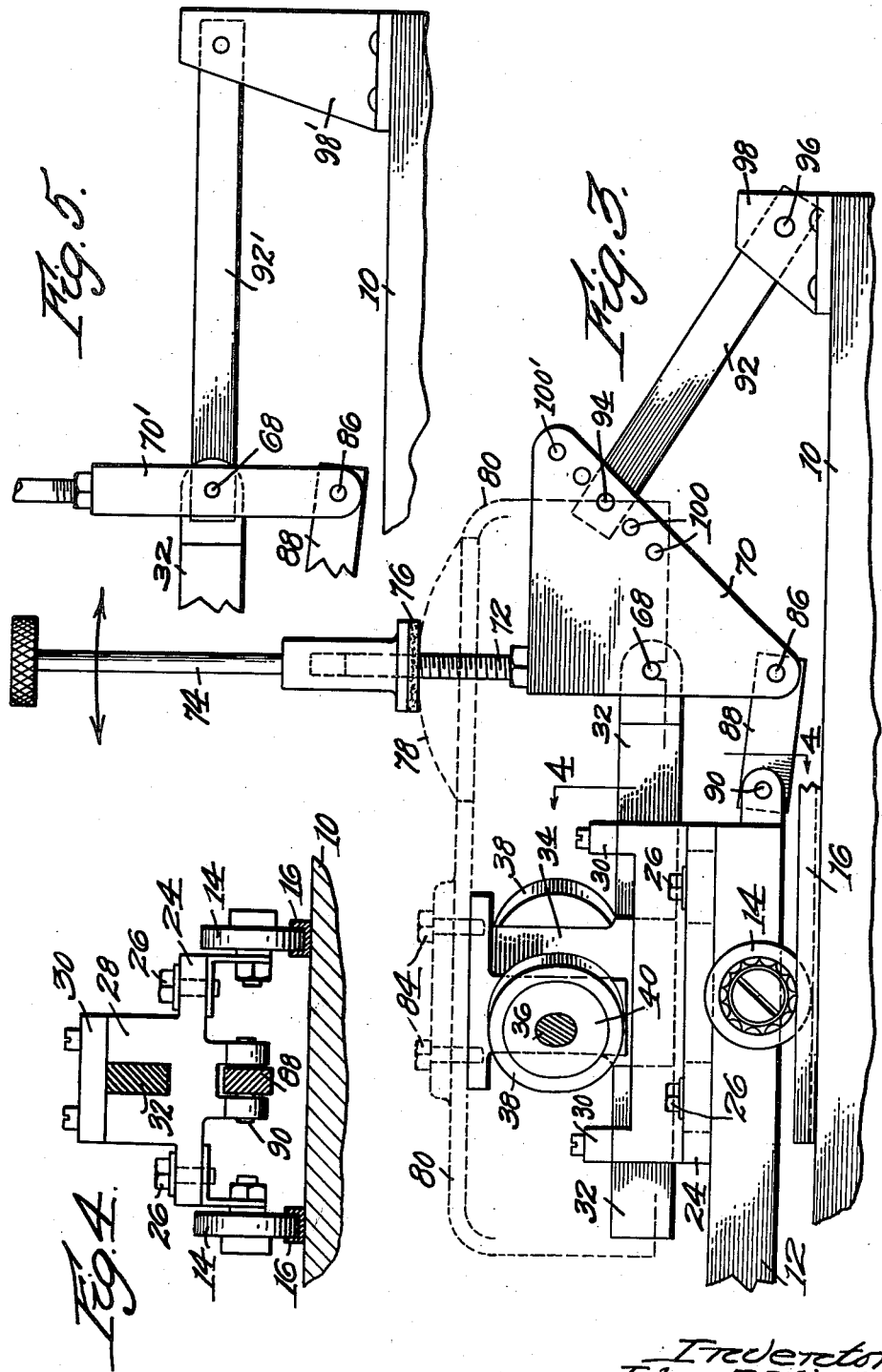

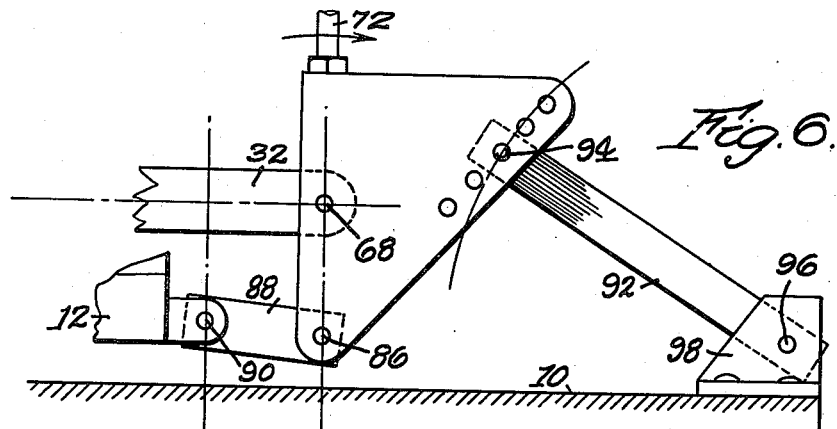
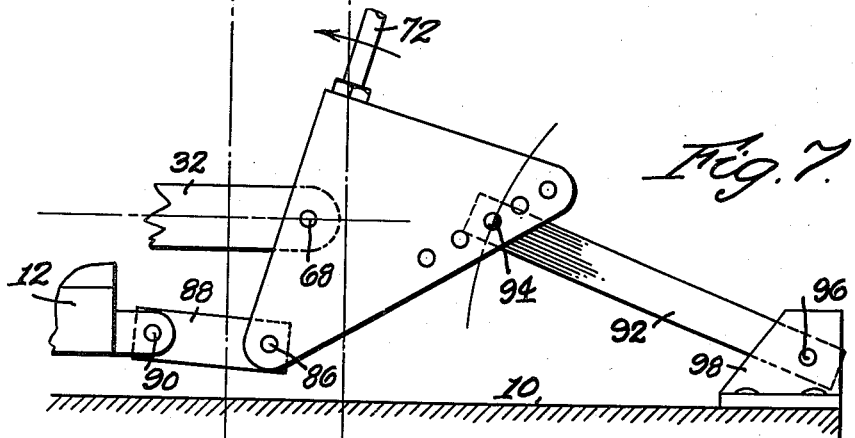
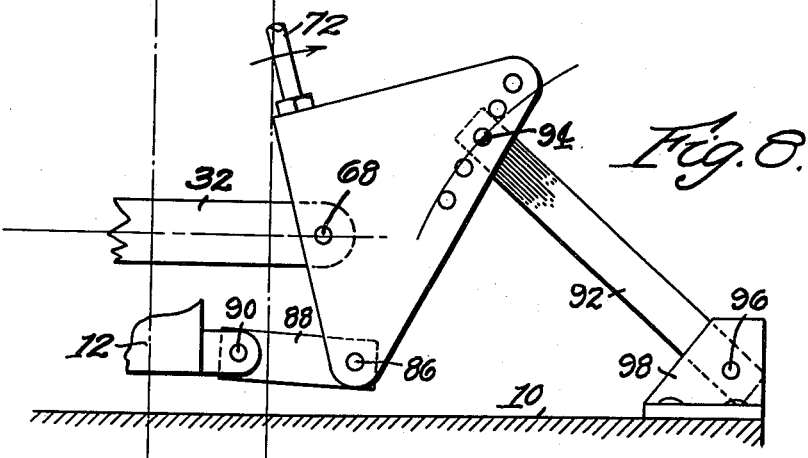

2,245,889

UNITED STATES PATENT OFFICE 2,245,889

VARIABLE SPEED TRANSMISSION

John E. Windle, North Grafton, Mass.

Application July 6, 1939, Serial No. 282,995

15 Claims. (Cl. 74—230.17)

This invention relates to a variable speed transmission drive and more particularly to a variable speed drive using variable diameter V-pulleys with V-belts, or a flat pulley, chain and sprocket or gears on the output side of the device, and wherein pulleys, chains, or gears of various desired sizes may be substituted for the output side driver, and various sizes of variable diameter pulleys may be used for both input and output sides of the drive, whereby the variation in range of speed of drive may be greatly increased over the speed variation of the devices heretofore known.

The principal objects of the invention include providing a mechanism to accomplish the greatly increased range of speeds above mentioned; providing a device capable of adjustment to accommodate various sizes of output drivers, whether they be chains, gears, or variable diameter or flat-face pulleys and various sizes of variable diameter pulleys for both input and output; to provide a variable speed transmission wherein both the input and output driving elements extend to the same side of the pulley shaft, whereby the prime-mover and the final driven shaft may be located closely adjacent or in alignment, the tension on the pulleys is equalized, preventing any tendency to twisting of the pulley shaft, or strain on the bearings, thus increasing efficiency, and whereby the space required for the device is substantially cut down; providing a variable speed transmission in which the movable flanges of both variable diameter pulleys move laterally in opposite directions with respect to the center line of the device; providing a variable speed transmission wherein the prime-mover is located on the same unit as the transmission, these elements being so constructed and arranged as to be movable simultaneously in opposite directions.

Other objects and advantages of the invention will appear hereinafter.

Reference is to be had to the accompanying drawings, in which—

Fig. 2 is a plan view of a part of the device of Fig. 1 but showing a different method of adjustment of the parts;

Fig. 3 is a side elevation, partly in section, of the device as shown in Fig. 1, with parts broken away;

Fig. 4 is a sectional view of the same on the line 4—4 of Fig. 3;

Fig. 5 is a detail view of the handle linkage in a position different from that of Fig. 3; and Figs. 6, 7 and 8 are diagrammatic showings of the operating linkage.

Figure 1:
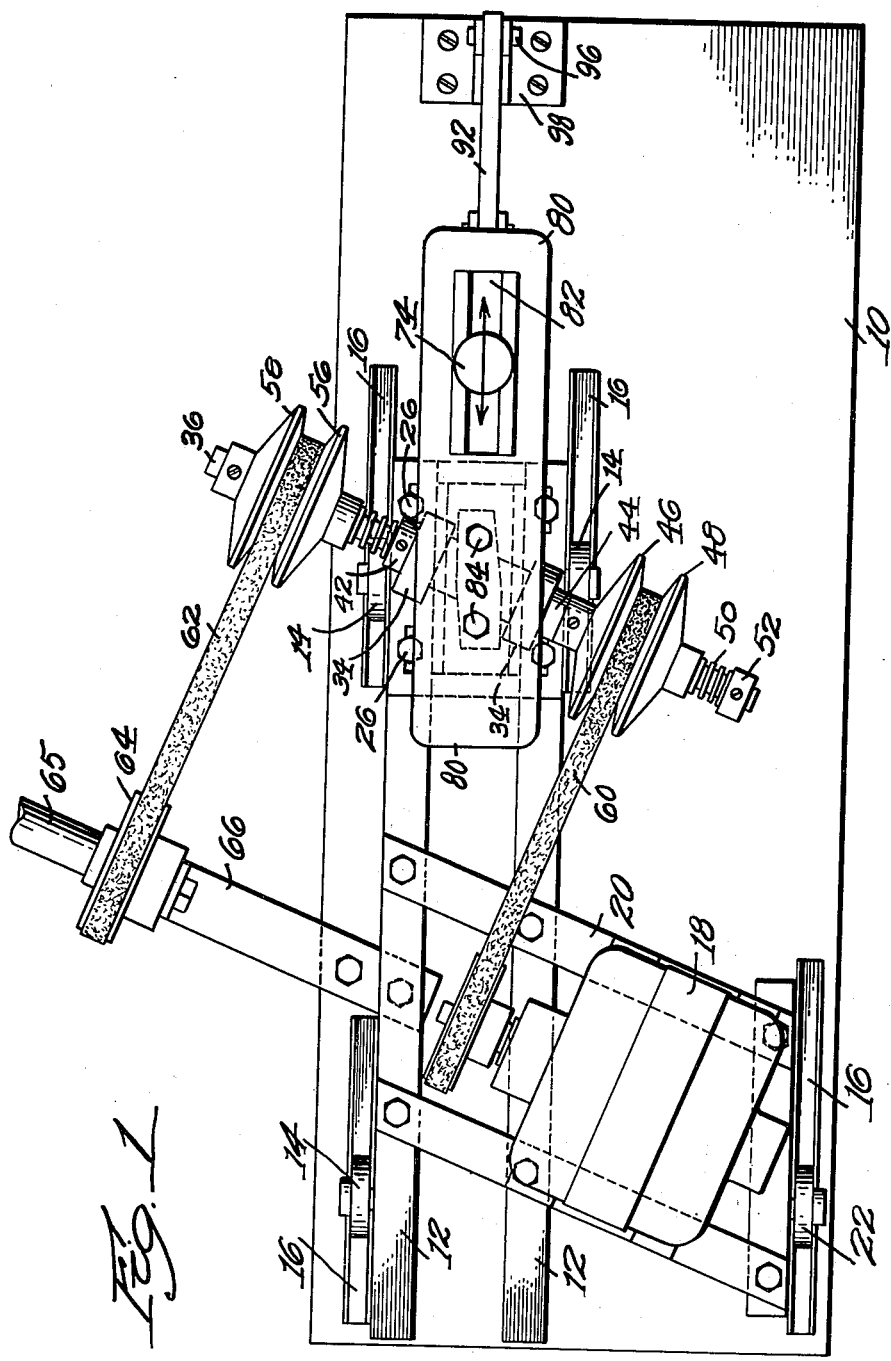
Fig. 1 is a plan view of a variable speed drive constructed according to the invention.

In the drawings, 10 indicates a convenient base or support for the entire apparatus, and may be a separate unit or a part of a machine to be operated. A carriage 12 made of spaced angle irons, is slidingly movable on wheels 14 running on the tracks 16, and carries at one end a motor 18 in conjunction with the skewed bracket 20, the latter having a wheel 22 similar to the wheels 14 but offset therefrom to accommodate the motor. At its other end the carriage 12 carries a base plate 24 adjustable thereon by means of the bolt and slot connections 26. At each end of the base plate 24 there are provided upwardly extending U-shaped members 28 having plates 30 bolted across the open ends of the members to form a guide passage for a bar 32 which is slidable with respect thereto.

At approximately its mid-point the bar 32 rigidly mounts an upstanding bearing support 34 for the pulley shaft 36, which is skewed with relation to the bar 32 and carriage 12, as shown in Fig. 1, and is parallel to the shaft of the motor 18. Bearing housings 38 are fixed to either side of the support 34 and rotatably support the shaft 36 through bearings 40. Adjacent the latter, outwardly thereof, are collars 42 and 44 fixed to the shaft 36, and next to the collar 44 there are located the pulley-forming cone-faced wheels 46, 48. The wheel 46 is fixed to the shaft and the wheel 48 is slidable thereon and pressed inwardly towards the bearing support by a coil spring 50, located at its end by a fixed collar 52.

Located by the collar 42 is a spring 54 similar to spring 50, constantly urging the slidable cone-faced wheel 56 outwardly from the bearing support 34 towards the fixed cone-faced wheel 58, fixed to shaft 36. A V-belt 60 connects the variable diameter pulley 46, 48 and the motor pulley and V-belt 62 connects the variable diameter pulley 56, 58 to the final driven pulley 64 located, if desired, on the base 10 by a bracket 66. The pulley 64 is fixed on a shaft 65.

At one end of the bar 32 there is pivoted at 68 a substantially triangular shaped link 70, which may, however, be made in any shape convenient or desired. This link stands vertically, as shown in Fig. 3, and has a screw-threaded rod 72 secured to a top surface thereof. Threaded for longitudinal adjustment on the rod 72 is a handle element 74 having a lower contacting surface 76 for clamping engagement with a rounded surface 78 on a guard housing 80 through a slot 82 of which the rod 72 extends. This housing is bolted at 84 to a top surface of the bearing support 34 for movement therewith. Thus the handle 74 may be clamped in adjusted position by screwing it down on the rod 72 for clamping engagement with the curved surface 78.

The lower end of the link 70, as seen in Fig. 3, is pivoted at 86 to one end of a short link 88 pivoted at its other end at 90 to the carriage 12. At a distance from the pivots 68 and 86 a link 92 is pivotally connected at one end at 94 to link 70, and the link 92 is pivoted adjacent its other end at 96 to a fixed support 98. The link 70 also is provided with a series of apertures 100, whereby the link 92 may be connected to link 70 at various desired points.

Referring to Figs. 6–8, it will be noted that the pivot point 68 is constrained to a straight line movement, parallel to the floor or base, and that the pivot point 94 must follow the arc of which the distance between points 94 and 96 is the radius. The pivot point 86, due to the pivoted link 88, may rise or fall in its movement longitudinally of the tracks. Therefore, it is clear that the point 86 travels farther in the same length of time, than point 68, and therefore the carriage 12 travels farther than the shaft 36, and due to the relation of the parts 32, 70, 88 and 92, the primary pivot point of the part 70, in its longitudinal travel, is between the points 68 and 86, whereby points 68 and 86 travel relatively oppositely, but in the same direction with respect to a fixed point.

In the operation of the device, the handle 74 is swung either to the right or left in the direction of the arrow in Fig. 3. When moved to the left, the sliding bar 32 is moved in the same direction relative to the carriage 12, since the link 92 will hold the link 70, at point 94, from any movement except that on the arc of which the link 92 is a radius. At the same time, the carriage 12 will move to the right at a speed greater than the bar 32 moves to the left. The result is that the motor 18 and its pulley move to the right in Fig. 1, and the shaft 36 and its pulleys also move to the right but at a greatly reduced speed, and hence the distance between the center-lines of the motor shaft and shaft 36 is decreased, and the distance between the center lines of the shaft 65 and the shaft 36 is increased. The pulley 46, 48 then attains its greatest diameter and the pulley 56, 58 its smallest diameter, representing the lowest speed of the shaft 65. Reversal of movement of handle 72 will reverse the direction of motion of the points 68, 86 and thereby steps up the transmission to its greatest output speed.

The above explanation relates to the general condition in which the pulleys 46, 48 are equal in diameter, and the ratio of travel of the shaft 36 to the carriage 12 must be as 1 to 2 in order to allow one pulley to fill an increased diameter, and the other to fill a decreased diameter, whereby the belt tension is maintained constant during the variation of the diameters.

However, it is desirable to be able to substitute different sized pulleys for either the input or output pulleys on the shaft 36 to obtain a still greater variation of speed. For this reason, the point of attachment of link 92 to the triangular link 70 is made adjustable to points 100 or 100', and other such attachment points may be located at any desired place on the link 70. Simply by changing the pivot point 94 to a point 100 or 100' or other location, the relative movements of the shaft 36 and motor 18 may be varied to accommodate the desired size of pulley on the shaft 36, thus greatly increasing the range of variation of speed. Thus, if the points 100 are used, a larger pulley may be substituted for the input pulley 46, 48, slowing the speed of the shaft 36, and if points 100' are used, a larger pulley may be substituted for the output pulley 56, 58, thereby increasing the resultant final drive speed.

In cases where it is desired to use a flat pulley, sprocket, or a pair of gears in place of the output pulley 56, 58, the link 92 is removed from the link 70 and another link 92' is directly connected to the point 68, as shown in Fig. 5, wherein the connection 92' is located in the same horizontal plane as the point 68, by means of the bracket 98'. In this case, an ordinary link 70' may be used in place of the link 70. This results in no movement of the shaft 36 and a rapid movement of the carriage 12, so that a still further variation of the speed is obtained, and the device is therefore not limited to the use of the adjustable diameter pulley, or even to various sized adjustable pulleys.

In some cases, it is desirable to use a more positive means than the handle 74 and its friction lock at 76 to actuate and hold the linkage 70 in position. It is proposed to use a screw and nut connection as shown in Fig. 2 for this purpose, the screw rod 110 being supported on the base 10 in brackets 112, against longitudinal movement. A hand wheel 114 is provided for turning the rod, and the threads thereof engage a non-rotatable nut 116 anchored to the carriage 12 by a bracket 118. With this arrangement the handle 74 may be dispensed with, as the movement of carriage 12 by the screw will produce the necessary relative movement of the shaft 36 by means of the linkage 70, 92.

Having thus described my invention and the advantages thereof, I do not wish to be limited to the details herein disclosed, otherwise than as set forth in the claims, but what I claim is:

1. In a variable speed transmission, the combination of a shaft having a variable diameter pulley thereon, and a support on which said shaft is slidable, with a prime mover shaft slidably mounted in operative relation to and from said first-mentioned shaft, and means connecting said support and said prime mover shaft to relatively move them.

2. In a variable speed transmission, a support, a prime mover shaft slidably mounted thereon, a variable diameter pulley also slidably mounted on the support in operative relation to the prime mover shaft, and means comprising a linkage connected to said support, shaft, and pulley to slide the shaft and the pulley relatively to each other and to the support.

3. In a variable speed transmission, a support, a carriage slidably mounted thereon and adapted to mount a prime mover shaft, a second shaft slidable with respect to the carriage, and means to relatively slide the carriage and second shaft, said means comprising a linkage connected both to said carriage and said shaft.

4. In a variable speed transmission, a support, a carriage adapted to mount a motor and shaft slidable on the support, a second shaft slidable on the support and having a variable diameter pulley operatively connected to the motor shaft, and means to relatively slide the carriage and second shaft in a predetermined relation, said means comprising a link pivoted to said support and a lever connecting said link, said carriage, and said shaft.

5. In a variable speed transmission, a movable carriage adapted to support a motor and its shaft, a guideway on said carriage, a member mounted for sliding movement in said guideway, a second shaft mounted on said member, and having a driving connection with the motor shaft, and means effective to relatively move said carriage and said member.

6. In a variable speed transmission, a support, a movable carriage on said support and adapted to mount a motor and its shaft, a guideway on said carriage, a member mounted for sliding movement in said guideway, a second shaft mounted on said member and having a driving connection with the motor shaft, and means effective to relatively move said carriage and member with respect to each other and to said support.

7. In a variable speed transmission, a support, a carriage on said support and adapted to mount a prime-mover shaft and its pulley, a second shaft slidably mounted on the carriage and having a variable diameter pulley operatively connected to the prime-mover pulley, a final drive shaft located adjacent the prime-mover shaft, and a driving connection between said second shaft and said final drive shaft, said prime-mover shaft and said second shaft being movable relative to each other and to the support.

8. In a variable speed transmission, a support, a carriage adapted to mount a prime-mover shaft and its pulley, a second shaft slidably mounted on the carriage and having a variable diameter pulley operatively connected to the prime-mover pulley, a final drive shaft located adjacent the prime-mover shaft, a driving connection between said second shaft and said final drive shaft, and means to relatively move both the carriage and second shaft in a predetermined relation with respect to said final drive shaft.

9. In a variable speed transmission, a carriage, a slidable element mounted on the carriage and supported thereby, the carriage and element being connected by a two-part linkage, a link having a fixed pivot point and pivotally connected to the linkage, means to actuate the linkage whereby the carriage and element are relatively slidable.

10. In a variable speed transmission, the combination with a carriage having a prime mover mounted thereon, a support slidable on the carriage and mounting a shaft, an expansible pulley on the shaft, driving means between said prime mover and said pulley, and means to take power from said shaft; of means adapted to move said prime mover carriage and said shaft support at varied speeds, and comprising a linkage connected to said carriage, said support, and a fixed element.

11. In a variable speed transmission, a support, means mounting said support for sliding movement, an element associated with said support, means on said support mounting said element for sliding movement in relation thereto, a first link pivoted to said support, a second link pivoted to said element, a pivot connection between said first and second links, and a third link having a fixed pivot and pivoted to one of said first and second links.

12. A variable speed transmission as recited in claim 11, in which said third link is adjustably pivoted to one of said first and second links.

13. In a variable speed transmission, a support, means mounting said support for sliding movement, an element associated with said support, means on said support mounting said element for sliding movement in relation thereto, a first link pivoted to said support, a second link pivoted to said element and to said first link, a third link having a fixed pivot and connected to said element, and means to pivot said second link.

14. In a variable speed transmission, the combination of a fixed support, a carriage movable thereon, and a member movable on said carriage; with means effective to relatively move said carriage and member with respect to each other and to the support, said means comprising a link pivoted to the carriage, a link pivoted to the member, said links being pivoted together, and means to swing one of said links.

15. A variable speed transmission as recited in claim 14 in which a third link is pivoted to said support and to said one link.

JOHN E. WINDLE.